(12) United States Patent
Peterson et al.

(10) Patent No.: US 11,345,978 B2
(45) Date of Patent: May 31, 2022

(54) SYSTEMS FOR ACID DIGESTION PROCESSES

(71) Applicant: Battelle Memorial Institute, Columbus, OH (US)

(72) Inventors: Rick Peterson, Columbus, OH (US); Michael Heinrichs, Columbus, OH (US); Vinay V. Gadkari, Columbus, OH (US); Rachid Taha, Dublin, OH (US); Slawomir Winecki, Dublin, OH (US); Darwin Argumedo, Columbus, OH (US)

(73) Assignee: Battelle Memorial Institute, Columbus, OH (US)

( * ) Notice: Subject to any disclaimer, the term of this patent is extended or adjusted under 35 U.S.C. 154(b) by 328 days.

(21) Appl. No.: 16/541,355

(22) Filed: Aug. 15, 2019

(65) Prior Publication Data

US 2020/0002784 A1 Jan. 2, 2020

Related U.S. Application Data

(62) Division of application No. 15/617,589, filed on Jun. 8, 2017, now Pat. No. 10,626,482.

(Continued)

(51) Int. Cl.
*C22B 59/00* (2006.01)
*C22B 3/06* (2006.01)
(Continued)

(52) U.S. Cl.
CPC .............. *C22B 59/00* (2013.01); *C01B 39/02* (2013.01); *C01B 39/46* (2013.01); *C01B 39/48* (2013.01); *C22B 1/005* (2013.01); *C22B 3/02* (2013.01); *C22B 3/065* (2013.01); *C22B 3/12* (2013.01); *C22B 7/007* (2013.01); *C22B 7/008* (2013.01);
(Continued)

(58) Field of Classification Search
CPC ............ C22B 59/00; C22B 3/04; C22B 7/007
See application file for complete search history.

(56) References Cited

U.S. PATENT DOCUMENTS 4,344,924 A * 8/1982 Lucas ..................... C22B 3/288
423/54
4,374,100 A 2/1983 Sebenik et al.
(Continued)

FOREIGN PATENT DOCUMENTS

CN 102453800 A 5/2012

*Primary Examiner* — Kevin Joyner
(74) *Attorney, Agent, or Firm* — Fay Sharpe LLP

(57) ABSTRACT

A system for recovering rare earth elements from coal ash includes a leaching reactor, an ash dryer downstream of the leaching reactor, and a roaster downstream of the ash dryer that is cooperatively connected to both the leaching reactor and the ash dryer. Coal ash is mixed with an acid stream such that rare earth elements present in the coal ash are dissolved in the acid stream, thereby creating (i) a leachate containing the rare earth elements and (ii) leached ash. The leachate is heated to obtain acid vapor and an acid-soluble rare earth concentrate. Mixing of the coal ash with the acid stream can occur in a leaching reactor and heating of the leachate can occur in a roaster. The acid-soluble rare earth concentrate can be fed to a hydrometallurgical process to separate and purify the rare earth elements.

9 Claims, 8 Drawing Sheets

Related U.S. Application Data

(60) Provisional application No. 62/347,185, filed on Jun. 8, 2016, provisional application No. 62/347,194, filed on Jun. 8, 2016.

(51) Int. Cl.
| | |
|---|---|
| *C22B 3/04* | (2006.01) |
| *C22B 7/00* | (2006.01) |
| *C01B 39/02* | (2006.01) |
| *C22B 3/02* | (2006.01) |
| *C22B 7/02* | (2006.01) |
| *C22B 1/00* | (2006.01) |
| *C01B 39/46* | (2006.01) |
| *C01B 39/48* | (2006.01) |
| *C22B 3/12* | (2006.01) |
| *C22B 21/00* | (2006.01) |

(52) U.S. Cl.
CPC ............ *C22B 7/02* (2013.01); *C22B 21/0023* (2013.01); *Y02P 10/20* (2015.11)

(56) References Cited

U.S. PATENT DOCUMENTS

| | | | |
|---|---|---|---|
| 4,816,236 A * | 3/1989 | Gardner | C01G 53/11 423/65 |
| 5,242,670 A * | 9/1993 | Gehringer | C01B 9/08 423/116 |
| 6,011,193 A | 1/2000 | Myler et al. | |
| 8,628,735 B2 | 1/2014 | Bhaduri | |
| 8,968,688 B2 | 3/2015 | Joshi et al. | |
| 9,394,586 B2 | 7/2016 | Joshi et al. | |
| 2004/0213717 A1 * | 10/2004 | Akahoshi | C22B 34/34 423/67 |
| 2015/0139871 A1 | 5/2015 | Joshi et al. | |

* cited by examiner

SYSTEMS FOR ACID DIGESTION PROCESSES

CROSS-REFERENCE TO RELATED APPLICATIONS

This application is a divisional of U.S. patent application Ser. No. 15/617,589, filed on Jun. 8, 2017, which claims priority to U.S. Provisional Patent Application Ser. No. 62/347,194, filed on Jun. 8, 2016, and to U.S. Provisional Patent Application Ser. No. 62/347,185, filed on Jun. 8, 2016. These applications are fully incorporated by reference in their entirety.

BACKGROUND

The present disclosure relates to the extraction and/or recovery of rare earth elements from coal ash, and systems and methods for doing so.

Rare earth elements (REEs) are a series of chemical elements found in the Earth's crust. REEs generally include elements 21, 39, and 57-71 on the periodic table. Due to their unique chemical properties, REEs have become critical in the development of many technologies spanning a range of applications including electronics, magnets, ceramics, computer and communication systems, transportation, health care, and national defense. The demand and cost of REEs has grown significantly over recent years, stimulating an emphasis on economically feasible approaches for REE recovery. Despite their criticality, however, there is currently not significant development of a domestic source of REEs.

Coal deposits in certain regions of the United States can be particularly rich in rare earth elements, on the order of about 1,000 parts-per-million (ppm). However, the combustion of coal in power stations for energy generation yields coal ash as its product. Coal ash may include fly ash and bottom ash from power generation stations, ash generated in a lower-temperature ashing process, and ash residual from a coal liquefaction process. The coal ash may contain REEs that are concentrated above 300 ppm, and the REEs could then be economically recovered. Processes for further concentrating and recovering REEs from coal ash would be desirable.

BRIEF SUMMARY

The present disclosure relates to acid digestion processes and systems for such acid digestion that can be used to recover and concentrate rare earth elements (REEs) from coal ash, as well as vanadium, lithium, and/or cobalt. Coal ash is preferred over raw coal, because the high organic content of raw coal would consume acid used in the acid digestion process, thereby making the process cost inefficient. Additionally, the concentration of REEs in raw coal or coal refuse is typically much lower than in coal ash.

In accordance with some illustrative embodiments disclosed herein, methods of recovering rare earth elements, vanadium, lithium, or cobalt from coal ash are disclosed. The methods include mixing coal ash with an acid stream such that rare earth elements present in the coal ash are dissolved in the acid stream, thereby creating (i) a leachate containing the rare earth elements, vanadium, lithium, or cobalt, and (ii) leached ash, and heating the leachate to obtain acid vapor and an acid-soluble concentrate containing the rare earth elements, vanadium, lithium, or cobalt. The acid-soluble rare earth concentrate may then be fed to a hydrometallurgical process to separate and purify the rare earth elements. The leached ash may be dried using heated air, which heated air may also be used to heat the leachate. The heated air that was used to dry the leached ash can include nitric acid with $NO_x$ components. The leachate may be heated to dryness and then subsequently to a preset temperature. This preset temperature will selectively convert base metals and/or rare earth target metals (i.e., REEs) in the leachate from a nitrate to an oxide. After this conversion, the solubility of the solids in aqueous solutions will change, allowing for a later more selective dissolution in the hydrometallurgical process to improve process economics. Additionally, conversion of metal nitrates to oxides will release NOx gases. Those $NO_x$ gases may be recovered by oxidation in air and then absorption in a solvent such as cool water or dilute acid. The dried leached ash can be recovered. The acid stream can be a nitric acid stream.

In accordance with some illustrative embodiments disclosed herein, systems for recovering rare earth elements, vanadium, lithium, or cobalt from coal ash are disclosed. The systems include a leaching reactor, an ash dryer downstream of the leaching reactor, and a roaster downstream of the leaching reactor. The roaster is cooperatively connected to both the leaching reactor and the ash dryer. The system may further include a solid-liquid separation device downstream of the leaching reactor, with the solid-liquid separation device feeding both the roaster and the ash dryer. A heat recovery exchanger may be present in the system between the leaching reactor and the roaster. The heat recovery exchanger receives the leachate containing rare earth elements from the leaching reactor and acid vapor recycled from the roaster. The system may also include a condenser downstream of the heat recovery exchanger. The condenser receives acid vapor from the heat recovery exchanger, and outputs both a liquid acid stream and a residual vapor stream. An absorption column may be provided downstream of the condenser. The absorption column receives both the acid recovered from the condenser and the residual vapor stream. The acid in the vapor stream is captured, and then the acid is recycled to serve as the acid stream that is mixed with the coal ash. The system may include a reactor heater upstream of the leaching reactor. The reactor heater provides preheated coal ash to the leaching reactor.

In accordance with some illustrative embodiments disclosed herein, other methods of recovering rare earth elements, vanadium, lithium, or cobalt from coal ash are disclosed. The methods include mixing coal ash with an acid stream in a leaching reactor such that rare earth elements present in the coal ash are dissolved in the acid stream, thereby creating a leachate containing the rare earth elements and leached ash, and heating the leachate in a roaster to obtain acid vapor and an acid-soluble rare earth concentrate. The roaster process may include further concentrating the leachate in a heat drum dryer using doctor knives to separate dried portions of the leachate, taking advantage of differential solubility of the dissolved metal salts to further separate and concentrate the rare earth elements. The heat drum dryer may be internally fired. The acid-soluble rare earth concentrate may then be fed to a hydrometallurgical process to separate and purify the rare earth elements. The leached ash may be dried in an ash dryer using heated air, which heated air may also be used to heat the leachate in the roaster. The heated air can include nitric acid with $NO_x$ components. The leachate may be heated in the roaster to dryness and then subsequently to a preset temperature. This preset temperature will selectively convert base metals and/or rare earth target metals (i.e., REEs) in the leachate from a nitrate to an oxide. After this conversion, the solubility of the solids in aqueous solutions will change, allowing for a later more selective dissolution in the hydrometallurgical process to improve process economics. Additionally, conversion of metal nitrates to oxides will release NOx gases. Those $NO_x$ gases may be recovered by oxidation in air and then absorption in a solvent such as cool water or dilute acid. The acid vapor from the roaster may be fed to a heat recovery exchanger. At least a portion of the acid vapor fed through the heat recovery exchanger can be used to preheat the leachate before the leachate is heated in the roaster. At least a portion of the acid vapor fed through the heat recovery exchanger may be fed to a condenser that recovers acid for recycling. The acid recovered from the condenser and air containing residual oxide gases can be fed to a packed absorption column. The recovered acid can be cooled in the packed absorption column and recirculated to absorb the oxide gases in the air and convert the oxide gases back to acid, thereby creating scrubbed air that is substantially free of oxide gases. The recovered acid can be combined with a makeup acid stream. The combination of the recovered acid and the makeup acid stream can be recycled back to the leaching reactor. Nitric oxide (NO) gas generated in the leaching reactor may be oxidized to $NO_2$ gas. The acid stream can be a nitric acid stream.

The present disclosure also relates, in accordance with some illustrative embodiments disclosed herein, to methods of recovering rare earth elements, vanadium, lithium, or cobalt from coal ash by liquefaction which are disclosed. By using coal ash from a coal liquefaction process, the REEs, vanadium, lithium, or cobalt can be more easily and economically leached, separated, concentrated, and recovered by chemical or mechanical means (such as those described above).

The methods include dissolving coal containing rare earth elements, vanadium, lithium, or cobalt in a first solvent to dissolve organic material in the coal and create a slurry containing coal ash enriched with REEs; separating the coal ash from the first solvent; removing residual organic material from the coal ash; and recovering the rare earth elements from the coal ash. The first solvent may be bio-based, such as a bio-based hydrogen transfer solvent. The coal ash can be separated from the first solvent by filtration, centrifugation, or settling. The residual organic material can be removed from the coal ash by washing the coal ash with a second solvent, which may be different from the first solvent. The residual organic material can also be removed from the coal ash by burning the coal ash at a temperature of about 300° C. to about 600° C.

The methods may further include separating the coal ash into fractions containing the rare earth elements before recovering the rare earth elements from the coal ash. The coal ash can be separated into the fractions by density using a sink/float analysis. The coal ash can alternatively be separated into the fractions by particle size by successively screening the coal ash. The coal ash could also be separated into the fractions by particle size through the use of other particle sorting equipment, such as cyclones or air classifiers. The coal ash can also be separated into the fractions by chemical leaching. The chemical leaching can use a mineral base, an inorganic salt, or a mineral acid. The mineral acid may be nitric acid. The chemical leaching can be done by acid digestion. A calcination step can precede the chemical leaching.

In particular embodiments, the coal ash can be separated into the fractions by successive processes, such as by density using a sink/float analysis, then by particle size by successively screening the fractions separated by density, and then by chemical leaching of the resulting fractions.

The methods may further include purifying the rare earth elements, vanadium, lithium, or cobalt in a solvent extraction circuit to separate individual elements from each other.

Also disclosed are methods of making a zeolite, comprising: adding a zeolite seed to a leach solution containing silicon and aluminum; and heating the leach solution to obtain the zeolite. The leach solution can be made by: mixing coal ash with a basic stream, thereby creating (i) a leach solution containing silicon and aluminum, and (ii) leached ash; and separating the leach solution from the leached ash. The leach solution may be heated at a temperature of about 100° C. to about 200° C., and for a time of about 12 hours to about 96 hours.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

In FIG. 4A, the elements are, running from left to right, Na, Li, Be, Mg, Si, K, Ca, Ti, V, Cr, Mn, Co, Ni, Cu, Zn, Ga, Ge, As, Se, Rb, and Sr. In FIG. 4B, the elements are, running from left to right, Zr, Nb, Mo, Ag, Cd, In, Sn, Sb, Te, Cs, Ba, Hf, Hg, Ta, W, Tl, Pb, Bi, Th, and U.

DETAILED DESCRIPTION

Figure 1:
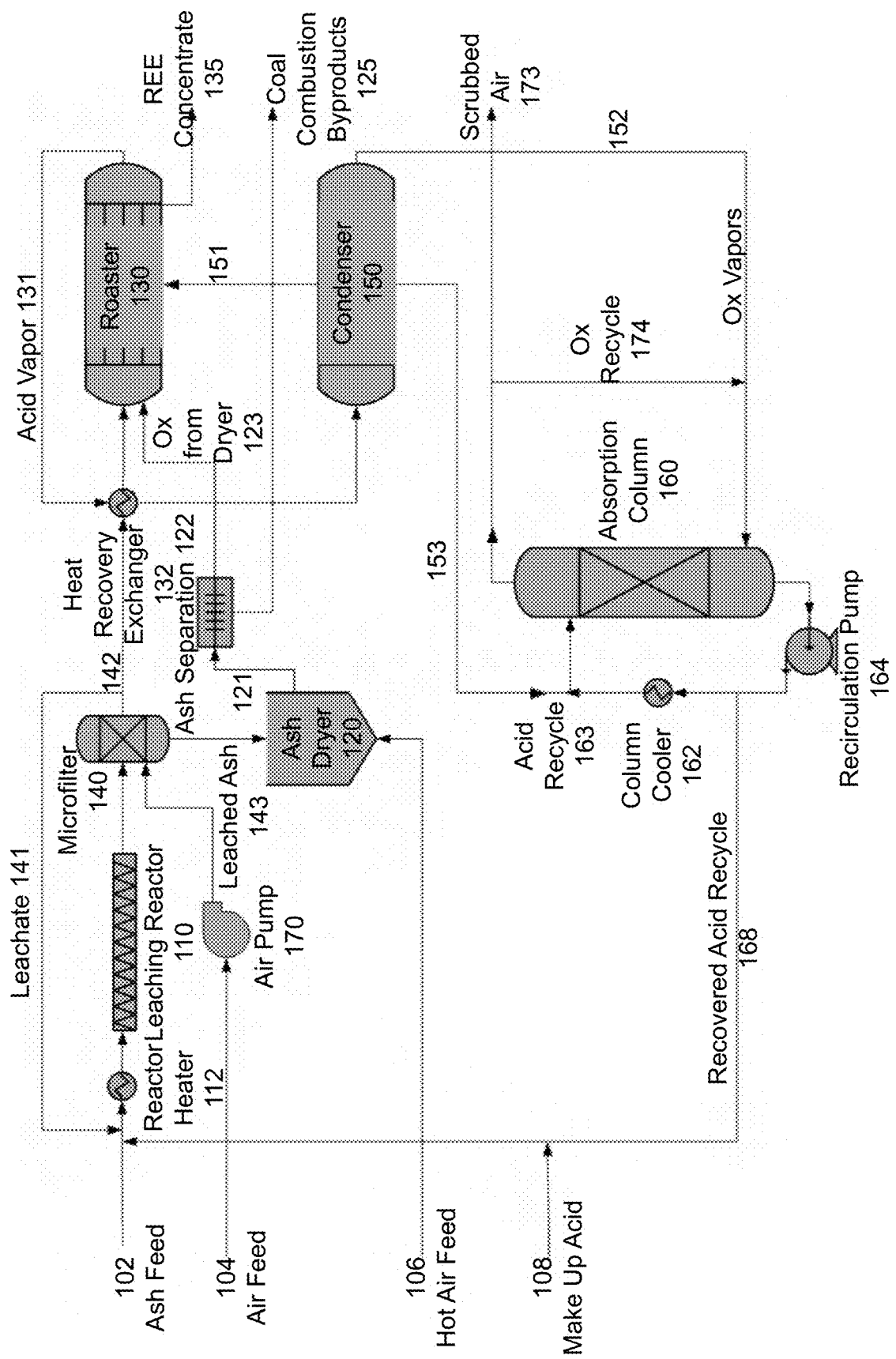
FIG. 1 is a schematic flow diagram of a closed-loop acid digestion process, namely a process of recovering rare earth elements from coal ash.

The present disclosure may be understood more readily by reference to the following detailed description of desired embodiments. In the following specification and the claims which follow, reference will be made to a number of terms which shall be defined to have the following meanings.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

The term "comprising" is used herein as requiring the presence of the named components/ingredients and allowing the presence of other components/ingredients. The term "comprising" should be construed to also include the term "consisting of", which allows the presence of only the named components/ingredients, along with any impurities that might result from the manufacture of the named components/ingredients.

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

The modifier "about" used in connection with a quantity is inclusive of the stated value and has the meaning dictated by the context. When used in the context of a range, the modifier "about" should also be considered as disclosing the range defined by the absolute values of the two endpoints. For example, the range of "from about 2 to about 10" also discloses the range "from 2 to 10." The term "about" may refer to plus or minus 10% of the indicated number. For example, "about 10%" may indicate a range of 9% to 11%, and "about 1" may mean from 0.9-1.1.

It should be noted that some of the terms used herein are relative terms. For example, the terms "upstream" and "downstream" are relative to the direction in which a fluid flows through various components, i.e. the flow fluids through an upstream component prior to flowing through the downstream component. It should be noted that in a loop, a first component can be described as being both upstream of and downstream of a second component.

The present disclosure refers to pH. When referring to the pH of a given solution as being "less than" a given value, this means the given solution is more acidic than the given value, i.e. closer to a pH of 1. When referring to the pH of a given solution as being "greater than" a given value, this means the given solution is more basic than the given value, i.e. closer to a pH of 14.

The present disclosure refers to heavy rare earth elements, or HREE. For purposes of this disclosure, the "heavy" rare earth elements are yttrium, europium, gadolinium, terbium, dysprosium, holmium, erbium, thulium, ytterbium, and lutetium.

The present disclosure also refers to light rare earth elements, or LREE. For purposes of this disclosure, the "light" rare earth elements are scandium, lanthanum, cerium, praseodymium, neodymium, promethium, and samarium.

Disclosed herein are systems and methods for recovering rare earth elements (REEs) from coal ash. The disclosed systems and methods advantageously provide an economical means of concentrating and recovering REEs from coal ash. In addition, other elements such as vanadium, lithium, and cobalt can be recovered from the coal ash as well. For purposes of this disclosure, discussion of REEs in general should also be considered as including vanadium, lithium, and cobalt.

With reference to FIG. 1, a diagrammatic representation of an acid digestion process for recovering rare earth elements from coal ash is depicted. Beginning in the upper left corner of FIG. 1, coal ash is fed into the system through ash feed 102. It is specifically contemplated that the coal ash fed into the system can be high-temperature ash (i.e., fly ash and/or bottom ash from power generation stations), low-temperature ash (i.e., ash generated in a lower-temperature ashing process), residual ash from a coal liquefaction process, or combinations thereof. The coal ash is fed into the system at a suitable rate, such as about 100 grams per minute (g/min) to about 500 g/min, including a rate of about 300 grams per minute, or at higher rates depending on the scaling of the system. For instance, it is contemplated that in a full-scale coal power plant, the coal ash feed could be on the order of 1,000 tons per day. Coal ash particle diameters can range from several submicrons up to several millimeters. The coal ash is generally composed primarily of silica, alumina, and iron oxides, with remainder trace elements and unburned carbon deposits.

The coal ash is then mixed with an acid stream, which is a liquid stream, usually aqueous, containing an acid, i.e. a pH of less than 7. The acid is desirably nitric acid. However, it is contemplated that other acids could be used, such as hydrochloric acid, sulfuric acid, hydrofluoric acid, and the like, and mixtures thereof. The acid stream may have a concentration of about 3M to about 8M. Desirably, the temperature of the acid stream is somewhat elevated over room temperature, though this is not necessary. As illustrated here, the acid stream is a combination of recycled acid 168, make-up acid 108, and leachate recycle 141. The total acid stream can be fed at any desirable rate, for example from about 0.5 liters per minute (L/min) to about 5 L/min, from any combination of these streams. The recycled acid 168 may provide an acid flow rate of about 0.5 L/min to about 1.5 L/min, and the leachate recycle 141 may provide an acid flow rate of about 0.5 L/min to about 2.5 L/min.

The mixture of coal ash and acid can be fed to a reactor heater 112 to preheat the mixture. The reactor heater can preheat the mixture from a temperature of about 32° F. to about 68° F. (entering temperature) to a temperature of about 80° F. to about 212° F. (exiting temperature). The reactor heater 112 then sends the preheated mixture to a leaching reactor 110. In this regard, the leaching reactor 110 is located downstream of the reactor heater 112.

The leaching reactor 110 is generally operated at a pressure of about 1 atm and a temperature between about 20° C. and about 120° C. Within the leaching reactor 110, the coal ash is brought into intimate contact with the acid stream and mixed therewith, such as with a static mixer or a fluidized bed. Mixing of the coal ash with the acid stream causes REEs, V, Co, and Li present in the coal ash to be dissolved in the acid stream, thereby creating (i) a leachate containing the REEs, V, Co, and Li, and (ii) leached ash. The mixture may have a residence time within the leaching reactor of about 30 seconds to about eight hours. Of course, this residence time may also be outside of this range, depending on circumstances. Exiting the leaching reactor, the leachate and the leached ash are still mixed together. In particular embodiments, an effective quantity of oxygen is introduced into the leaching reactor 110 during mixing in order to oxidize $NO_x$ gases. In this regard, nitrous oxide (NO) gas generated in the leaching reactor 110 can be oxidized to $NO_2$ gas.

Selectivity for the REEs, V, Co, and Li is higher than that for other elements present in the coal ash (e.g., iron, aluminum, silicon), causing concentration of the REEs, V, Co, and Li in the acid stream over the coal ash. The leaching reactor 110 generally causes an increase in the surface area of the coal ash while removing some surface contaminants therefrom, which improves the pozzolanic activity of the coal ash and makes it ideal for use in cements or other construction materials.

The leached ash produced within the leaching reactor 110 can be subsequently filtered out from the leachate using a solid-liquid separation device 140, such as a centrifuge, cyclone, settler, or filter, or, for example, a ceramic microfilter. As shown in FIG. 1, the solid-liquid separation device 140 is located downstream of the leaching reactor 110 and is fluidly connected thereto. In certain embodiments, the solid-liquid separation device 140 may be an air-scoured filter receiving air from an air feed 104 that is fed by an air pump 170 located upstream of the solid-liquid separation device 140. Two streams exit the solid-liquid separation device 140, a leachate stream 142 and a leached ash stream 143. If desired, a portion of the leachate can be recycled upstream of the leaching reactor 110 or reactor heater 112, as indicated by reference numeral 141. This recycled leachate can be fed from the solid-liquid separation device 140 to the reactor heater 112 or the leaching reactor 110 at a rate of, for example, about 1.5 L/min. The leachate stream 142 is then sent to a roaster 130 at a rate of about 0.5 L/min to about 5 L/min, depending on whether recycling is occurring.

The leached ash filtered out by the solid-liquid separation device 140 subsequently travels to an ash dryer 120, where the leached ash is dried using heated air. The heated air is produced by hot air feed 106. The ash dryer 120 is generally operated at a pressure of about 1 atm and a temperature of about 100° C. to about 300° C., for example 200° C. The leached ash may have a residence time within the ash dryer of about two minutes to about one hour to be fully dried. Of course, the residence time may also be outside of this range, depending on circumstances. The ash dryer 120 is important for economic recovery of the REEs. The high temperatures experienced by the leached ash in the ash dryer 120 generally cause boiling off and conversion of salts or esters (e.g., nitrates) entrained in the leached ash, thereby allowing the salts or esters to be recovered in the system. This also prevents the discharge of salts or esters from the leached ash wherever it is stored.

After the leached ash is dried in the ash dryer 120, it is separated from the heated air by an ash separation process 122. Any suitable process for separating the dried ash from the heated air may be employed. The dried ash and any other coal combustion byproducts may then be recovered from the system (reference numeral 125). This may occur at a rate of about 95 g/min to about 495 g/min, depending on the scale of the system, and can be for example about 285 g/min to about 295 g/min.

The heated air that is separated from the dried ash in the ash separation process typically contains some nitric acid with $NO_x$ components. As can be seen in FIG. 1, this heated air containing oxides (reference numeral 123) can be recovered from the ash dryer 120 and ash separation process 122, and then fed to the roaster 130.

Returning to the leachate stream 142, a heat recovery exchanger 132 can be present downstream of the leaching reactor 110 and upstream of the roaster 130. More specifically, the heat recovery exchanger 132 is shown in FIG. 1 as being located immediately downstream of the solid-liquid separation device 140 and immediately upstream of the roaster 130. The heat recovery exchanger 132 receives a portion of the leachate recovered from the solid-liquid separation device 140 and preheats the leachate using acid vapor 131 recovered from the roaster. The leachate then enters the roaster 130.

The roaster 130 can be described as being located downstream of both the leaching reactor 110 and the ash dryer 120 and is cooperatively connected to both the leaching reactor 110 and the ash dryer 120. The roaster 130 is also located immediately downstream of the heat recovery exchanger 132 (i.e., downstream of the leaching reactor 110 with respect to the leachate). The roaster 130 is also located downstream of the ash dryer 120 with respect to the recovered heated air containing oxides 123. That is, the roaster 130 receives recovered heated air from the ash dryer 120 and/or ash separation process 122, and receives the leachate 142 from the leaching reactor 110, the solid-liquid separation device 140, and/or the heat recovery exchanger 132. Additional acid may be fed into the roaster via draw stream 151 if desired to help with heat recovery. The roaster 130 is generally operated at a pressure of about 1 atm and a temperature higher than that of the leaching reactor 110. The operating temperature of the roaster is high enough to convert a majority of the acid to the gas phase and to convert a majority of common elements from a salt to an oxide, and in embodiments is about 200° C. The roaster may take the form of, for example, an evaporator followed by an internally-fired heat drum dryer.

The roaster 130 can be thought of as performing dual steps. First, the REEs (along with V, Co, and Li) are concentrated by drying the leachate to obtain metal salts. Next, the metal salts are crystallized by heating to obtain metal oxides. In this regard, the leachate is generally heated in the roaster 130 to dryness, and then subsequently to a preset temperature, which may be in the range of about 200° C. This preset temperature will selectively convert base metals in the leachate from a nitrate to an oxide. In contrast, many of the target metals (i.e., REEs, V, Co, Li) remain in their nitrate form at this temperature. After the conversion from nitrate to oxide, the solubility of the solids in aqueous solutions will change, allowing for a later more selective dissolution in the hydrometallurgical process to improve process economics. This permits removal of common elements (e.g. Al, Fe) from the REEs. Additionally, conversion of metal nitrates to oxides will release NOx gases. These $NO_x$ gases released by the metal oxides can be subsequently recovered, as later described. The leachate may have a residence time within the roaster as needed to obtain the desired REEs in the desired form.

Heating of the leachate in the roaster 130 as described above results in an acid vapor 131 and an acid-soluble rare earth concentrate. 135. The acid-soluble rare earth concentrate can typically be recovered from the roaster 130 at a rate of about 5 g/min to about 15 g/min, or higher depending on the feed rate. The acid-soluble rare earth concentrate is particularly suitable for feeding to a hydrometallurgical process to separate and purify the REEs. Various hydrometallurgical processes can be employed for separating and purifying the REEs, as will be appreciated by those skilled in the art. These processes may include oxalate precipitation to purify rare earths, or more preferably solvent extraction to purify and separate rare earths into distinct products.

During testing of the systems and methods disclosed herein, it was observed that bands of concentrated REEs with varying characteristics formed during roasting of the leachate in the roaster 130. Accordingly, it is specifically contemplated that the roaster can include doctor knives that separate dried portions of the leachate from the REEs to further concentrate the REEs prior to the hydrometallurgical process. As explained previously, the roaster may take the form of, for example, an evaporator followed by an internally-fired heat drum dryer. In this regard, it has been found that by finishing the drying of the rare earth concentrate on the outside of a heated drum, the metal salts will precipitate at different locations. This can then be scraped to obtain portions that are enriched with certain desirable REEs.

With continued reference to FIG. 1, the acid vapor 131 obtained from heating the leachate in the roaster 130 is compressed and recycled. Recovery of the $NO_x$ gases advantageously reduces the amount of nitric acid required by the system. In FIG. 1, the acid vapor is specifically recycled back through the heat recovery exchanger 132, upstream of the roaster 130. In this way, the acid vapor preheats the leachate that is fed to the roaster 130 (i.e., to preheat the leachate).

After passing through the heat recovery exchanger 132, the acid vapor travels to a condenser 150 for recovery of the acid for recycling. As shown in FIG. 1, the condenser 150 is located downstream of the roaster 130 and the heat recovery exchanger 132, and receives acid vapor therefrom. In particular embodiments, the acid vapor contains $NO_x$ gases and nitric acid.

The condenser 150 is generally operated at a pressure of about 1 atm and a temperature of between about 40° C. and about 50° C. As explained above, the temperature at which the roaster 130 is operated is generally about 200° C. This large temperature differential between the roaster 130 and the condenser 150 is important for improving acid recovery greater than 90% by the condenser 150. In this regard, as the acid vapor passes through the condenser 150, it is cooled, which is preferable for the absorption of $NO_2$ back into the liquid phase. Recovery of the acid advantageously reduces the amount of new acid required to be provided to the system. Feasibility testing of the systems and methods disclosed herein evidenced recovery by the condenser 150 of greater than 90% of the acid used in the system.

When the acid stream used in the system is nitric acid, the NO gas generated in the leaching reactor 110, roaster 130, and ash dryer 120 must be oxidized to $NO_2$ prior to being absorbed back into the acid stream. It has been discovered that this oxidation rate is improved at high temperatures (e.g. 200° C.) and can occur during heating in the roaster 130 and drying in the ash dryer 120 with the introduction of an effective quantity of oxygen therein.

Referring again to FIG. 1, the condenser 150 outputs a recovered acid stream 153 and a gas stream 152. The gas stream is generally air containing residual oxide gases (e.g., $NO_x$ gases). The gas stream 152 is fed to an absorption column 160, such as a packed absorption column. The packed absorption 160 column is located downstream of the condenser 150. The absorption column 160 is generally operated at a pressure of about 1 atm and a temperature of between about 20° C. and about 30° C. As explained above, the temperature at which the condenser 150 is operated is between about 40° C. and about 50° C.

Within the absorption column 160, the gas stream is contacted with a solvent, such as cool water or dilute acid, to recover the remaining acid. As illustrated here, the solvent is the recovered acid 153, which can also be recycled via line 163. This converts the oxide gases back to acid, thereby creating scrubbed air 173 that is substantially free of oxide gases. As shown in FIG. 1, recirculation of the recovered acid can be achieved using a recirculation pump 164, and cooling of the recovered acid can be achieved using a column cooler 162. The scrubbed air is then ready to be discharged. Any residual oxide vapors can be recycled back to the absorption column 160, such as is shown in FIG. 1 via line 174, typically a flow rate of between about 15 g/min and about 20 g/min. The recovered acid is then removed from the absorption column 160, typically at a flow rate of about 0.5 L/min to about 1.5 L/min. The recovered acid 168 is generally combined with a makeup acid stream 108, as previously described, and recycled back as the starting acid that is mixed with the coal ash 102. Most desirably, the system will only require less than about 2% makeup acid (i.e., the ratio of the makeup acid to recovered acid).

Figure 2:
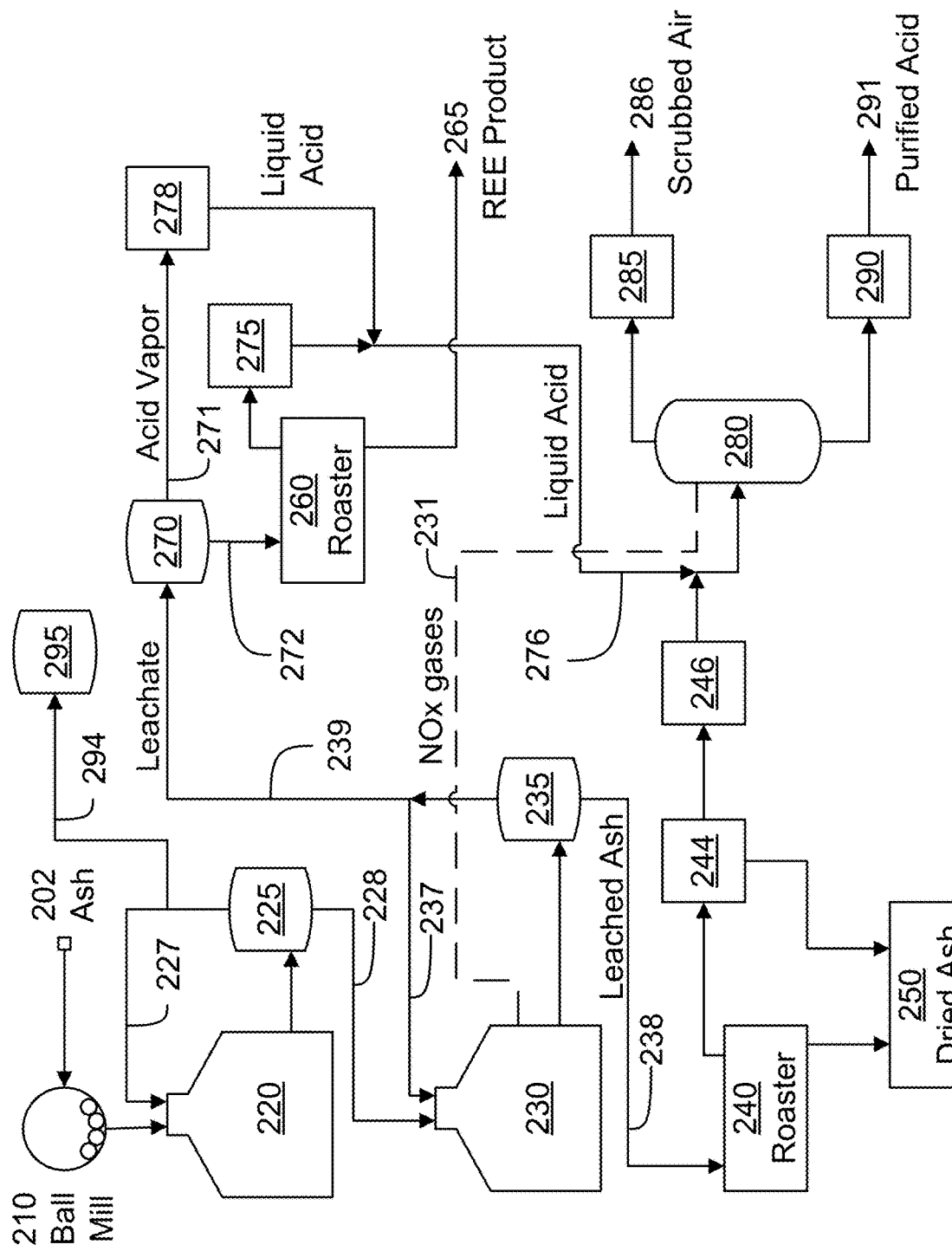
FIG. 2 is a second schematic flow diagram of a closed-loop acid digestion process for recovering rare earth elements from coal ash.

FIG. 2 is a diagrammatic representation of another acid digestion process for recovering rare earth elements from coal ash. All of the components of FIG. 1 are present, and additional components are added.

Beginning in the upper left corner of FIG. 2, coal ash is fed into the system through ash feed 202 to ball mill 210. It was found that milling the ash achieved better leaching efficiencies. The ball mill reduces the particle size of the ash from a range of 10 microns to 100 microns to a range of 1 micron to 40 microns.

The coal ash then travels downstream from ball mill 210 to caustic tank 220 where it is mixed with a basic/caustic stream, which is a liquid stream, usually aqueous, containing a base, i.e. a pH of greater than 7. In this regard, the basic stream leaches silicon and aluminum (e.g. in the form of silica and alumina) from the coal ash, thus increasing the concentration of REEs and improving the leaching efficiency further downstream. The base is desirably sodium hydroxide (NaOH). However, it is contemplated that other bases could be used, such as potassium hydroxide, sodium bicarbonate, magnesium hydroxide, calcium hydroxide, and the like, and mixtures thereof. The basic stream may have a concentration of 1% to about 10% of the base (w/w), though the concentration can also be higher. Desirably, the temperature of the basic stream is somewhat elevated over room temperature, though this is not necessary. The basic stream can be fed at any desirable rate. The ash then travels from caustic tank 220 to caustic solid-liquid separator 225, where the ash is separated from the basic stream. The basic solution can be recycled to the tank 220 via line 227. The ash slurry travels to leaching reactor 230 via line 228.

Alternatively, the basic solution filtered from the pretreatment of the milled coal ash can then be used to produce a zeolite material for use as an adsorbent, catalyst, catalyst support, or ion exchange media. This is done by heating the filtrate (i.e. basic solution) for a time after adding a seed material, such as a zeolite crystal or a template compound. The heating temperature may be from about 100° C. to about 200° C., and the heating time may be from about 12 hours to about 96 hours. The resulting zeolite may contain aluminum and silicon, as well as other elements such as potassium, sodium, oxygen, and hydrogen. The molar ratio of silicon to aluminum in the resulting zeolite may be from about 4:1 to about 8:1. This is illustrated in FIG. 2, with line 294 carrying the leach solution to processing tank 295 to produce the zeolite.

It is also noted that the functions of the ball mill 210 and the caustic tank 220 could be combined together, with the ball milling taking place within a basic solution.

The leaching reactor 230 is downstream of the caustic tank 220. The leaching reactor 230 of FIG. 2 serves the same function as leaching reactor 110 of FIG. 1. In the leaching reactor of FIG. 2, the coal ash is mixed with an acid stream. This mixing causes REEs present in the coal ash to be dissolved in the acid stream, thereby creating (i) a leachate containing the REEs, V, Co, and Li, and (ii) leached ash. Again, an effective quantity of oxygen can be introduced into the leaching reactor 230 during mixing to oxidize $NO_x$ gases. Exiting the leaching reactor, the leachate and the leached ash are still mixed together. Gases exit via line 231, which are sent to absorption column 280.

The leached ash and the leachate are subsequently separated in a solid-liquid separation device 235, such as a centrifuge, cyclone, settler, or filter. The solid-liquid separation device 235 is located downstream of the leaching reactor 230 and is fluidly connected thereto. In certain embodiments, the solid-liquid separation device 140 may be a drum filter. Two streams exit the solid-liquid separation device 235, a leachate stream 239 and a leached ash stream 238. If desired, a portion of the leachate can be recycled back to the leaching reactor 230, as indicated by reference numeral 237.

The leached ash 238 is a slurry of ash and acid. This slurry subsequently travels to an ash roaster/dryer 240, where the leached ash is dried. The dried ash and any other coal combustion byproducts may then be recovered from the system (reference numeral 250).

The acid vapor, which may contain ash particles, travels from roaster 240 through a particle separation device 244, such as an electrostatic precipitator, to remove residual ash particles, which can also be recovered (reference numeral 250). The acid vapor then passes through condenser 246 to convert any acid from vapor into the liquid state, and the liquid acid is subsequently sent to absorption column 280.

Returning to the leachate stream 239, the leachate stream 239 is sent to an evaporator 270 to remove additional acid from the leachate and further concentrate the REEs. The evaporator operates at a temperature usually greater than 100° C. Acid vapor exiting the evaporator 270 travels via line 271 to condenser 278, to convert the acid to the liquid state, and the liquid acid then travels to absorption column 280 via line 276.

The concentrated REE leachate, containing acid and REEs (and V, Co, and Li), then enters the roaster 260 via line 272. The roaster 260 can be described as being located downstream of both the leaching reactor 230 and the evaporator 270. The roaster 260 is generally operated at a pressure of about 1 atm and a temperature of about 150° C. to about 200° C. The operating temperature of the roaster is high enough to convert a majority of the acid to the gas phase and to convert a majority of common elements from a salt to an oxide. The roaster can be equipment such as a spray dryer or rotary kiln.

The acid digestion in the leaching reactor 230 leads to formation of nitrate salts with the general molecule formula $M(NO_3)_x$, where $M(Al^{3+}, Si^{2+}, Sc^{3+}, Eu^{3+} \ldots)$ is the cation extracted from fly ash and X is the valence: +1 (for Na, K, ... ), +2 (Ca, Mg, Sr, ... ) and +3 (Ce, La, Cu, Fe, Al, Si, ... ). In the roaster 260, the various metals in the leachate are dried into metal salts (i.e. nitrates). The nitrate salts are then thermally decomposed to metal oxides, which can be insoluble in water. In particular, iron and aluminum nitrates decompose at temperatures of about 100° C. to about 200° C., while REE nitrates decompose at temperatures of about 300° C. to about 400° C. Sodium and calcium nitrates decompose at temperatures above about 400° C. As a result, iron and aluminum can be separated from the REEs in later processing steps.

Heating of the leachate in the roaster 260 as described above results in an acid vapor and an acid-soluble rare earth concentrate 265 which can be recovered and further processed in later downstream steps. The acid vapor obtained from heating the leachate in the roaster 260 travels to condenser 275 to be converted to the liquid state, and the liquid acid then travels to absorption column 280 via line 276.

The absorption column 260 receives a liquid acid stream 276 which contains acid recovered from roaster 240, roaster 260, and evaporator 270 via condensers 246, 275, 278, respectively. The absorption column 260 also receives a gas stream 231 from leaching reactor 230. Within the absorption column 280, the gas stream is contacted with a solvent, such as cool water or dilute acid. This converts the oxide gases back to acid, thereby creating an air stream that travels through a scrub 285 to capture any residual NOx gases and results in scrubbed air 286, which can be discharged. The recovered acid is then removed from the absorption column 160 and purified and/or combined with a makeup acid stream to obtain purified acid 291 which can be recycled back as the starting acid that is mixed with the coal ash in leaching reactor 230.

Also disclosed herein are other methods for recovering rare earth elements (REEs) from coal. Ideally, the coal has been liquefied to obtain coal ash enriched with REEs. Other terms that can be used to describe the coal ash include char or liquefaction residuals. The disclosed methods advantageously provide an economical means of concentrating and recovering REEs from coal by liquefaction.

Figure 5:
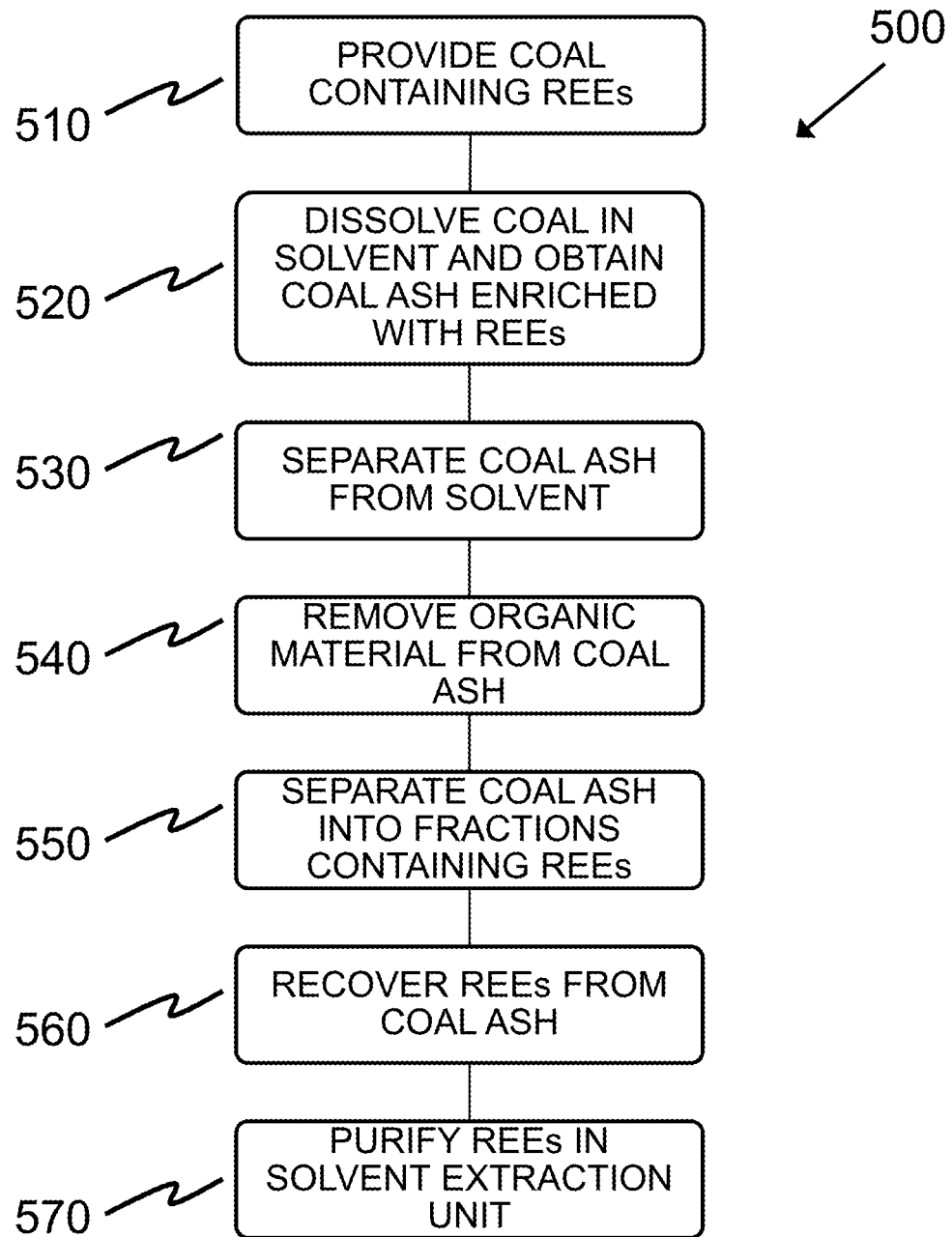
FIG. 5 is a flow chart illustrating an exemplary method for recovering rare earth metals from coal ash by liquefaction in accordance with some embodiments of the present disclosure.

FIG. 5 is a flowchart showing a general method 500 for recovering REEs from coal by liquefaction. The methods include receiving coal containing REEs 510. In particular embodiments, the coal is subjected to a liquefaction process to obtain coal ash enriched with REEs. By using coal ash from a liquefaction process, it has been found that REEs in the coal ash can be more easily and economically leached, separated, concentrated, and recovered by chemical or mechanical means, such as those disclosed above in FIG. 1 and FIG. 2.

The coal 510 is subsequently dissolved in a first solvent 520. Dissolution of the coal in the first solvent 520 dissolves organic material in the coal and creates a slurry containing coal ash enriched with REEs. In certain embodiments, the first solvent may be bio-based, such as soybean oil. Bio-based solvents are oils derived from plants or animals (rather than being derived from crude oil). It is to be understood that the first solvent can be any suitable solvent capable of causing dissolution of the coal. Desirably, the temperature of the coal/first solvent mixture can be between about 300° C. to about 550° C., and the pressure can be from about 400 psi to about 1200 psi. The residence time can be between about 5 minutes to about 120 minutes.

After dissolution of the coal in the first solvent 520, the coal ash obtained therefrom is subsequently separated from the first solvent 530. Separation of the coal ash from the first solvent 530 can be accomplished by any suitable means. In particular embodiments, the coal ash is separated from the first solvent by a separation process selected from the group consisting of filtration, centrifugation, or settling. The organic material remains in the first solvent, and the first solvent can be further processed to obtain coal liquid products such as fuels or chemical feedstocks.

Once the coal ash is separated from the first solvent 530, any residual organic material in the coal ash is removed 540. Removing the residual organic material from the coal ash 540 can be accomplished by any suitable means. For example, in some embodiments, the residual organic material is removed from the coal ash 540 by washing the coal ash with a second solvent, such as tetrahydrofuran. The second solvent used to wash the coal ash is typically different from the first solvent used to cause dissolution of the coal.

In other embodiments, the residual organic material is removed from the coal ash 540 by burning the coal ash at a temperature sufficient to cause removal of the residual organic material, such as by burning the coal ash at a temperature from about 300° C. to about 600° C. Other methods for removal of the residual organic material from the coal ash may be used, such as comminution, froth flotation, or gravimetric separations.

After the residual organic material is removed from the coal ash 540, other processes can be used to concentrate/enrich the REEs, such as those processes described in FIG. 1 and FIG. 2.

In certain embodiments, after removing the residual organic material from the coal ash 540, the coal ash may be separated into fractions 550, some of which may preferentially contain REEs or preferentially contain particular REEs. Separating the coal ash into fractions 550 can be accomplished by any suitable means. For example, in some embodiments, the coal ash is separated into fractions 550 by density using a sink/float analysis. In other embodiments, the coal ash is separated into fractions 550 by particle size by successively screening the coal ash, or using other particle sorting equipment, such as air classifiers or cyclones. In yet other embodiments, the coal ash is separated into fractions 550 by chemical leaching. The chemical leaching can use a mineral base, such as sodium or potassium hydroxide, carbonates, or ammonia. In other embodiments, the chemical leaching uses a mineral acid or an inorganic salt. The mineral acid may be any suitable acid capable of separating the coal ash into fractions. In yet other embodiments, the chemical leaching is performed by acid digestion. The acid digestion can be performed by any acid, such as nitric acid, etc. The acid may have a concentration of about 3M to about 8M. Desirably, the temperature of the coal ash/acid is somewhat elevated over room temperature, though this is not necessary. The temperature can be from about 20° C. to about 120° C. Such processes are described above. In yet further embodiments, separation of the coal ash into fractions can be accomplished using a salt solution such as ammonium sulfate to remove REEs from the ash.

In particular embodiments, the chemical leaching may be preceded by a calcination step. It is also to be understood that, in particular embodiments, the coal ash is separated into fractions 550 by successive processes. That is, in certain embodiments, the coal ash is separated into fractions 550 by density using a sink/float analysis, then by particle size by successively screening the fractions separated by density, and then by chemical leaching of the resulting fractions.

In some embodiments, the step of separating the coal ash into fractions 550 is omitted, and a step of recovering the REEs from the coal ash 560 immediately follows the step of removing the residual organic material from the coal ash 540. In other embodiments, the step of separating the coal ash into fractions 550 is employed prior to recovering the REEs from the coal ash 560. Recovery of the REEs from the coal ash 560 may be accomplished by any suitable means, such as leaching, or any other suitable chemical or mechanical means as will appreciated by those skilled in the art.

In certain embodiments, after recovering the REEs from the coal ash 560, the REEs are purified in a solvent extraction circuit to separate individual REEs 570 from each other. Separation of the REEs is particularly advantageous when the coal ash contains multiple different REEs.

The following examples are provided to illustrate the systems and methods of the present disclosure. The examples are merely illustrative and are not intended to limit the disclosure to the materials, conditions, or process parameters set forth therein.

EXAMPLES

Example 1

In feasibility studies using the method of FIG. 1, 10 grams of coal ash in 255 mL of dilute acid produced roughly 0.6 grams of roasted product.

Example 2

Key rare earth elements (REEs) include scandium (Sc), vanadium (V), neodymium (Nd), yttrium (Y), dysprosium (Dy), terbium (Tb), and praseodymium (Pr). Scandium is primarily used as an alloying compound with aluminum to make high performance, lightweight alloys. Vanadium is used largely as an alloying compound to strengthen steel. but is also useful as a catalyst.

Tests were performed using a starting fly ash having the following concentrations:

| Elements | Concentration (ppm) |
| --- | --- |
| REE + Y + Sc | 545 ± 13.4 |
| Sc | 36 ± 1.4 |
| V | 279 ± 12 |
| Y | 104 ± 5.3 |
| Co | 44 ± 2.5 |
| Li | ~166 |

Tests were performed at multiple nitric acid concentrations: 17%, 34%, 51%, and 68% (w/w). The tests were performed on unmilled fly ash with particle size of about 10 microns to about 100 microns, although one test was done with milled fly ash having a particle size of about 1 micron to about 40 microns. The results are shown in the following table. They indicate reduced leaching efficiency at higher acid concentrations, which is likely due to passivation of the bulk aluminum and iron phases preventing further leaching. Aluminum and iron leach efficiency averaged 11.5% and 6.1%, respectively, in the 17% and 34% acid concentrations, compared to 3.4% and 2.4% at the higher acid concentrations.

| Starting Nitric Acid Concentration in PCC Fly Ash Leaches | | | | | | |
|---------|------|------|------|------|------|------|
| Element | 17% | 17% | 17% | 34% | 51% | 68% | 34% (milled) |
| Sc | 19.2% | 20.8% | 21.5% | 21.5% | N/A | N/A | 55.3% |
| Y | 24.6% | 26.7% | 28.0% | 28.0% | 14.9% | 13.0% | 46.9% |
| La | 19.0% | 19.3% | 20.0% | 19.0% | 9.9% | 8.2% | 35.4% |
| Ce | 21.0% | 21.5% | 21.7% | 27.0% | 11.9% | 9.9% | 34.0% |
| Pr | 20.3% | 21.7% | 22.4% | 22.9% | 11.6% | 10.0% | 36.3% |
| Nd | 20.8% | 22.6% | 23.4% | 23.9% | 12.3% | 10.5% | 39.5% |
| Sm | 22.5% | 24.0% | 25.0% | 25.4% | 13.7% | 11.8% | 40.5% |
| Eu | 22.7% | 24.5% | 25.4% | 26.4% | 14.8% | 12.7% | 42.4% |
| Gd | 25.0% | 27.2% | 28.5% | 28.8% | 15.7% | 13.7% | 45.2% |
| Tb | 23.3% | 25.5% | 26.9% | 28.1% | 15.4% | 13.4% | 44.3% |
| Dy | 24.1% | 26.2% | 27.6% | 28.6% | 15.5% | 13.0% | 41.9% |
| Ho | 24.6% | 26.8% | 28.0% | 28.6% | 15.2% | 13.3% | 41.8% |
| Er | 23.8% | 26.2% | 27.5% | 27.8% | 14.8% | 12.6% | 43.8% |
| Tm | 23.0% | 25.2% | 26.4% | 26.9% | 14.4% | 12.0% | 42.2% |
| Yb | 21.2% | 23.1% | 24.7% | 24.8% | 12.9% | 10.6% | 36.3% |
| Lu | 21.2% | 22.6% | 23.9% | 24.3% | 13.0% | 10.2% | 34.6% |

Next, caustic pretreatment (tank 220 in FIG. 2) was tested. There were six tests performed. The caustic solution used was sodium hydroxide, and three different concentrations were tested (10%, 5%, and 1% NaOH) at two different temperatures (20° C. and 90° C.). Each pretreatment was done with a residence time of one hour, and unmilled fly ash was used as the starting material. After pretreatment, leaching with 34% nitric acid was performed at 90° C. with a residence time of 30 minutes. After leaching, a sample was taken for analysis of scandium via Inductively Coupled Plasma Optical Emission Spectrometry (ICP-OES). An extra test 7 was done using milled fly ash. The conditions and results for each test are shown in the following table.

| Test | Concentration of NaOH (w/w) | Caustic Temperature/ Reaction time | Concentration of nitric acid | Acid Leach Temperature/ Reaction time | Scandium % leached |
|------|-----------------------------|-----------------------------------|------------------------------|--------------------------------------|---------------------|
| 1 | 10% | 20° C./1 hour | 34% | 90° C./30 min | 23.17% |
| 2 | 10% | 90° C./1 hour | 34% | 90° C./30 min | 54.27% |
| 3 | 5% | 20° C./1 hour | 34% | 90° C./30 min | 23.05% |
| 4 | 5% | 90° C./1 hour | 34% | 90° C./30 min | 38.08% |
| 5 | 1% | 20° C./1 hour | 34% | 90° C./30 min | 23.40% |
| 6 | 1% | 90° C./1 hour | 34% | 90° C./30 min | 21.77% |
| 7 | 10% (milled ash) | 90° C./1 hour | 34% | 90° C./30 min | 88.21% |

Figure 3:
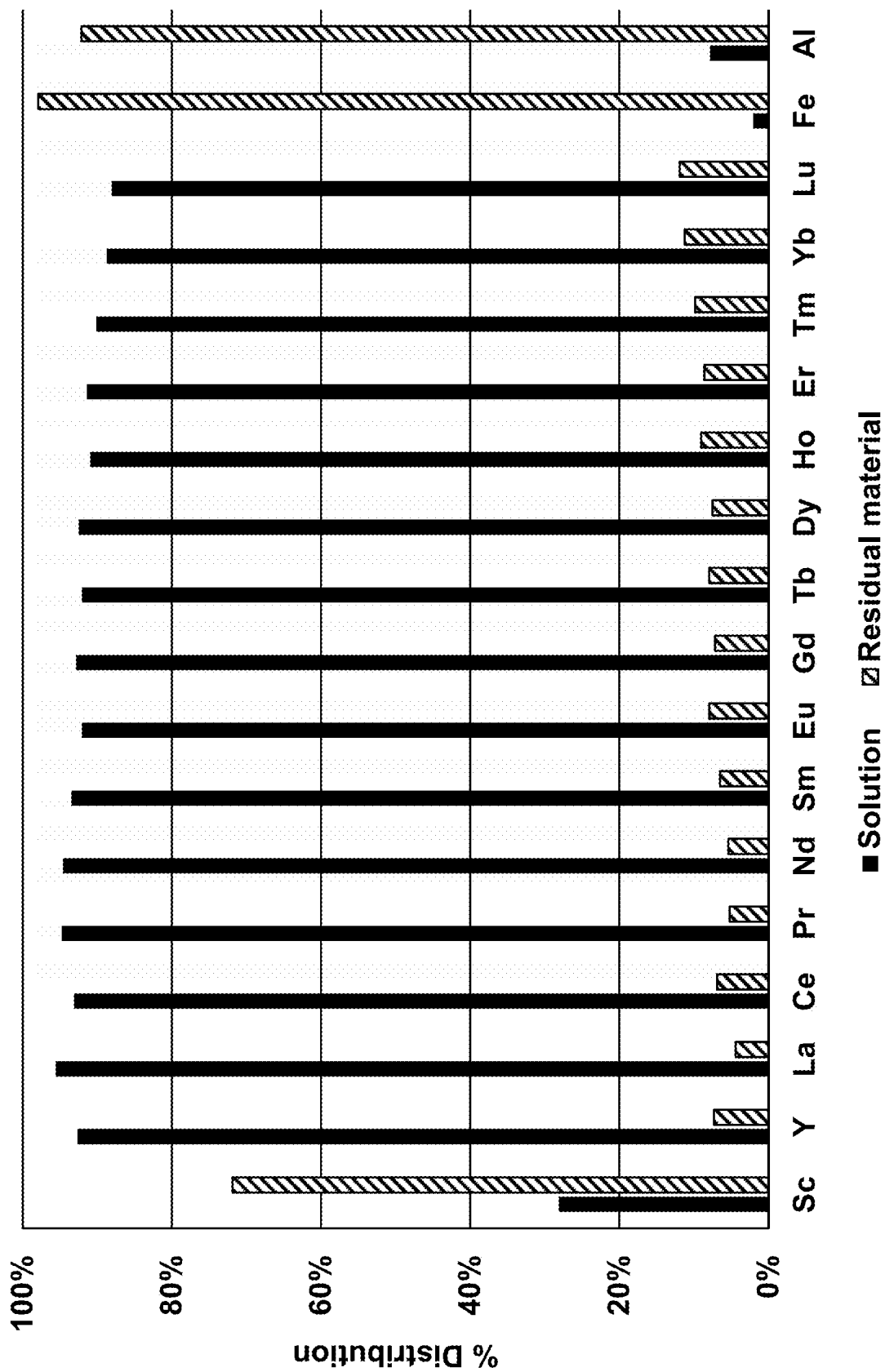
FIG. 3 is a bar graph showing the distribution of rare earth elements after treating at 200° C., in solution (left side) and in residual solids (right side). The y-axis runs from 0% to 100% in increments of 20%. The elements are, running from left to right, Sc, Y, La, Ce, Pr, Nd, Sm, Eu, Gd, Tb, Dy, Ho, Er, Tm, Yb, Lu, Fe, and Al. For all elements except Sc, Fe, and Al, the amount in solution is higher than the amount in residual solids.
Figure 4A:
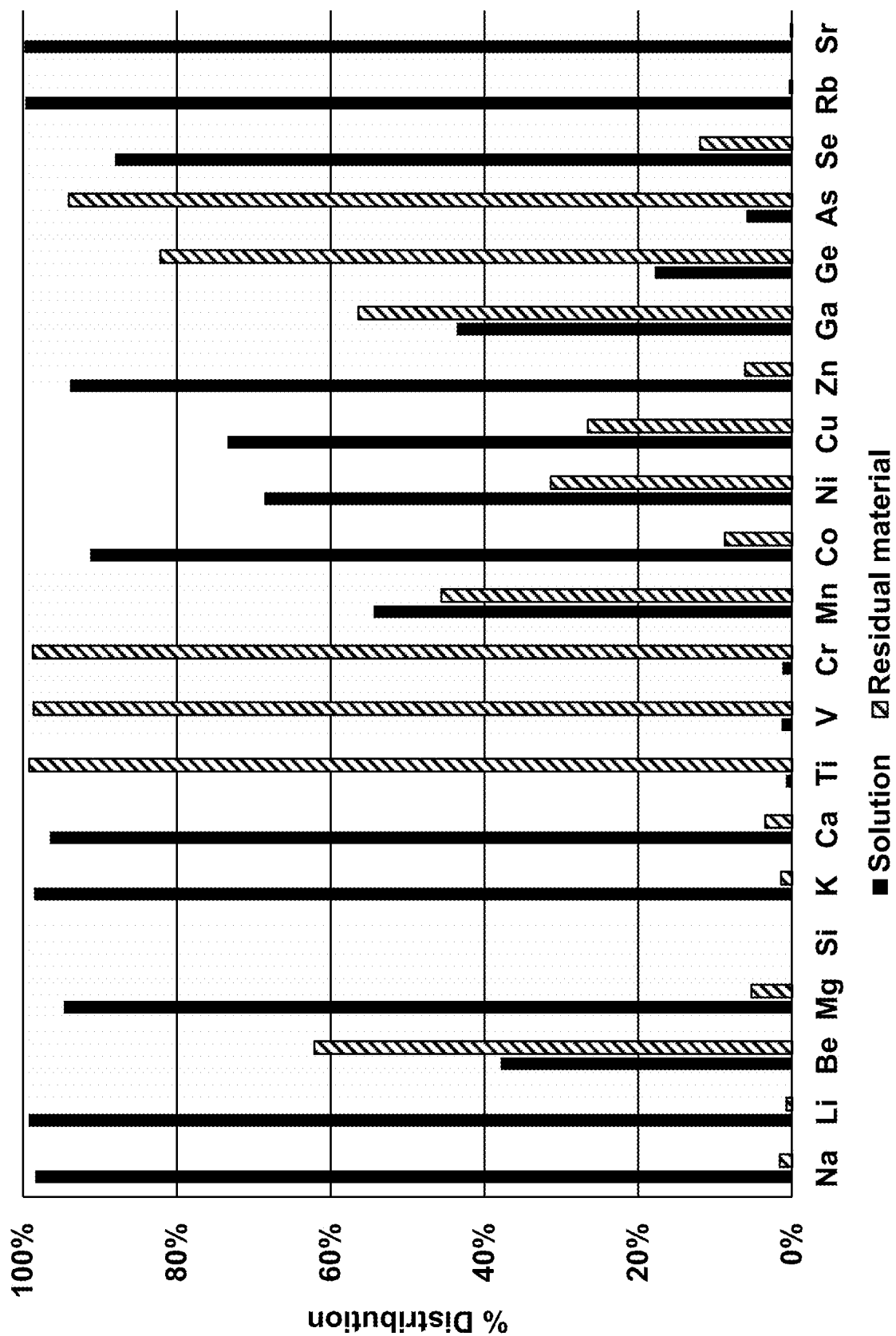
FIG. 4A and FIG. 4B are bar graphs showing the distribution of other elements after treating at 200° C., in solution (left side) and in residual solids (right side). The y-axis runs from 0% to 100% in increments of 20%.
Figure 4B:
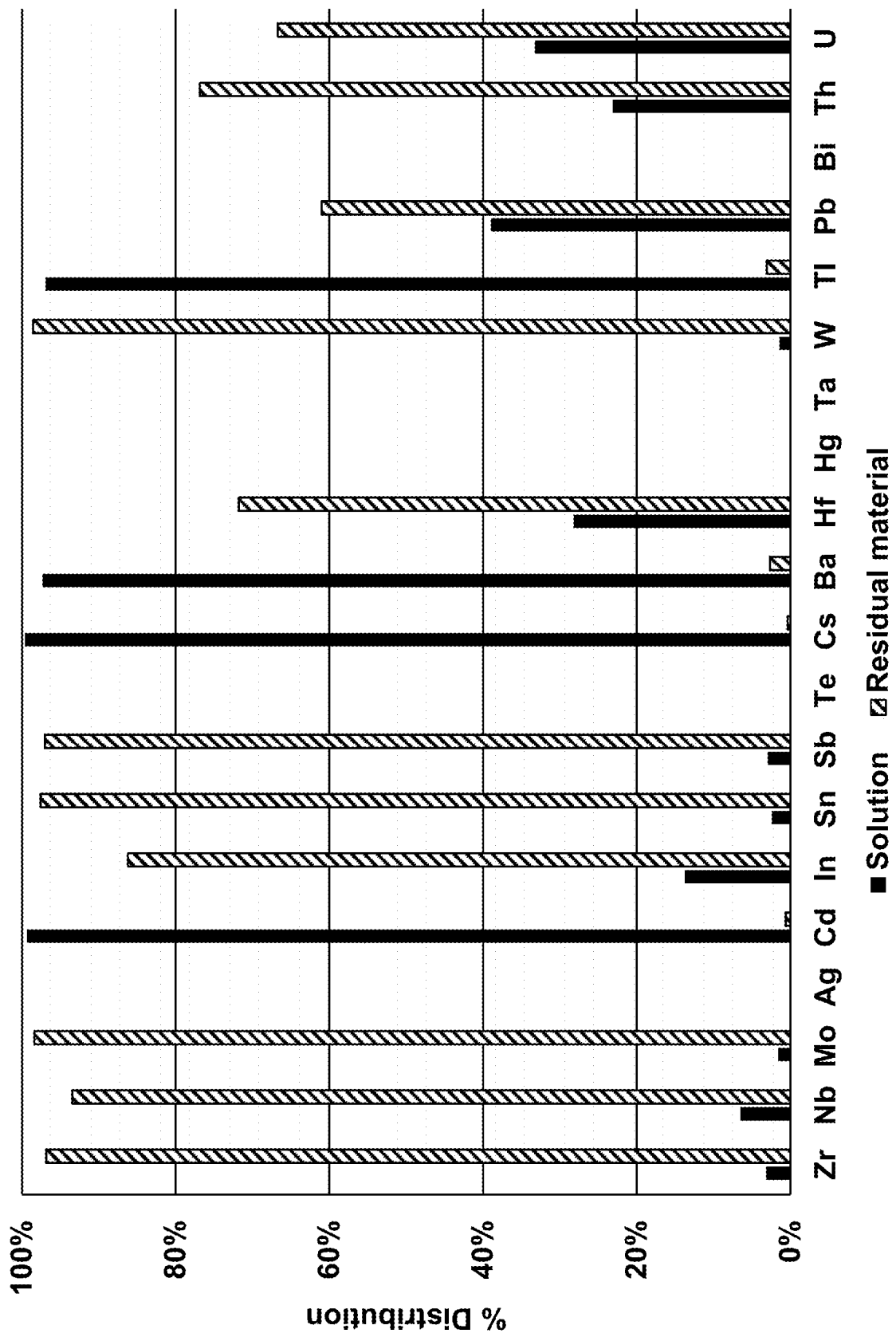

Next, tests were performed on leachate from fly ash. 100 grams of fly ash was leached in nitric acid for 24 hours, then the slurry was filtered via 0.22-micron filter. The fraction of dissolved material was 11.5% without any pretreatment of ash. The dissolved material obtained from acid leaching was treated at a single temperature of 200° C. The solids and water leach solutions were also analyzed by ICP-MS after treatment at 200° C. FIG. 3, FIG. 4A, and FIG. 4B report the % distribution of each element in the two fractions.

FIG. 3 suggests that most of the REE nitrates produced by leaching of fly ash in nitric acid solution are not decomposed to oxides after 200° C. heat treatment. However, most of the aluminum and iron decomposed to oxides, therefore they can be separated from the REEs. Around 70% of scandium is converted to oxide at 200° C., and about 30% remains in the nitrate form and can be separated from the aluminum and iron.

FIG. 4A and FIG. 4B show the % distribution for the other elements between the water leach and residual solids. Most of the titanium, vanadium, chromium, niobium, molybdenum, indium, tin, tungsten, and antimony nitrates decompose to insoluble oxides and therefore can separated from REEs. Other elements such as manganese, gallium, and lead decomposed partially to insoluble oxides. These results show that roasting can be used to separate REEs from other elements.

Finally, the effect of pH on the recovery of REEs was tested. Extraction tests used leach solution from fly ash, which was dried using a heating lap (about 150° C.). Then, dry material was leached in deionized water (250 mL), forming a loaded solution. The loaded solution was adjusted to different pHs as indicated below. The loaded solution was then extracted using 15% CYANEX 572 in Solvent 467 diluent. CYANEX 572 is a phosphorus based chelating extractant formulated for the extraction and purification of rare earth elements. Solvent 467 is the trade name for a kerosene range aliphatic diluent. However, in practice, any high boiling solvent in which the extractant is soluble can be used, including aromatic diluents.

For the calculation of percent recovery in the extractant (organic phase), a mass balance was performed using the results from ICP-MS analysis done on the aqueous phase and using as starting material the mass of each species in the solution loaded from leaching and roasting tests. Also, a negative mass in extractant was calculated for some species due to analytical error, so any negative mass calculated was assumed to be zero. Furthermore, some results obtained from ICP-MS analysis were below detection limits. Consequently, calculations were performed using the given detection limit. The following table shows the percent recoveries of rare earths and other species in the extractant after extraction of the solution at different pH. This table also shows the purity or selectivity at different pHs.

| | % Recovery | | | | | |
|---------|---------|---------|---------|---------|---------|---------|
| Species | pH 1.03 | pH 2.04 | pH 2.51 | pH 3.34 | pH 4.01 | pH 4.48 | pH 4.99 |
| Sc | 60.0% | 90.00% | 90.00% | 50.00% | 98.00% | 60.00% | 98.00% |
| Y | 68.4% | 99.79% | 99.78% | 99.78% | 99.88% | 99.98% | 100.00% |
| La | 0.0% | 0.00% | 0.00% | 0.00% | 72.02% | 86.86% | 98.28% |

-continued

| | % Recovery | | | | | | |
|---|---|---|---|---|---|---|---|
| Species | pH 1.03 | pH 2.04 | pH 2.51 | pH 3.34 | pH 4.01 | pH 4.48 | pH 4.99 |
| Ce | 0.0% | 11.75% | 7.43% | 23.74% | 95.23% | 98.62% | 99.90% |
| Pr | 0.0% | 2.39% | 5.41% | 44.90% | 97.20% | 99.25% | 99.95% |
| Nd | 0.0% | 14.09% | 18.21% | 61.51% | 98.12% | 99.47% | 99.97% |
| Sm | 0.0% | 79.28% | 82.87% | 95.43% | 99.70% | 99.89% | 100.00% |
| Eu | 0.0% | 91.43% | 92.91% | 98.15% | 99.81% | 99.80% | 99.99% |
| Gd | 0.0% | 92.40% | 94.07% | 97.68% | 99.77% | 99.93% | 100.00% |
| Tb | 0.0% | 98.09% | 98.27% | 99.08% | 99.83% | 99.69% | 99.98% |
| Dy | 31.2% | 99.49% | 99.57% | 99.67% | 99.89% | 99.95% | 100.00% |
| Ho | 51.4% | 99.73% | 99.74% | 99.70% | 99.90% | 99.76% | 99.99% |
| Er | 74.4% | 99.58% | 99.60% | 99.67% | 99.90% | 99.91% | 100.00% |
| Tm | 91.5% | 99.83% | 99.83% | 99.15% | 99.90% | 99.32% | 99.97% |
| Yb | 97.2% | 99.95% | 99.95% | 99.85% | 99.91% | 99.88% | 99.99% |
| Lu | 97.4% | 99.77% | 99.77% | 98.84% | 99.88% | 99.07% | 99.95% |
| Fe | 89.6% | 97.39% | 97.39% | 86.95% | 99.48% | 89.56% | 99.48% |
| Al | 7.1% | 0.00% | 0.00% | 0.80% | 98.80% | 99.47% | 99.97% |
| Si | 60.0% | 90.00% | 90.00% | 50.00% | 98.00% | 60.00% | 98.00% |
| REE + Y + Sc out of total REE + Y + Sc Available | 24.4% | 50.88% | 50.90% | 60.98% | 95.14% | 95.93% | 99.66% |
| REE + Y + Sc out of total measured species (purity or selectivity) | 1.37% | 4.18% | 4.19% | 7.15% | 0.88% | 1.04% | 1.04% |
| REE + Y + Sc out of total measured species excluding Silica (purity or selectivity) | 2.11% | 18.45% | 18.76% | 18.51% | 0.97% | 1.12% | 1.17% |

In summary, ball milling and caustic pretreatment of the ash allowed for high recovery of REEs, with leaching efficiencies for scandium as high as 86% and near complete recovery of total REEs as a weighted average. Milling of the ash to a particle size of about 4 microns to about 5 microns allowed these recoveries to be realized with a contact time of about one hour with 10% sodium hydroxide solution at 90° C., and leaching in 34% nitric acid for 30 minutes at 90° C.

A first recovery of the rare earth elements by thermal roasting of the loaded acid can oxidize the iron and aluminum between 100° C. and 200° C., generating an insoluble oxide material. In testing with actual leach solutions, 90% of the REEs could be recovered from the roasted solids with a water leach, while omitting over 90% of the iron and aluminum, and over 60% of the uranium and thorium. The water leach had a concentration of 1.2% REEs, effectively leading to over a 20× increase in purity of the REEs over the fly ash feed.

Solvent extraction testing suggested that extraction for REEs was most selective at a pH of 3.4 (i.e. between 3 and 4), where 61% of REEs were extracted at over 7% purity (over 120× concentration over the feed fly ash). pHs between 1 and 5 generally permitted good recovery. The primary contaminants were sodium, aluminum, silica, calcium, and iron, but sodium, potassium, magnesium, and calcium were largely excluded from the extract. At pH 5, near quantitative REE recovery could be achieved (over 99%), including less valuable lanthanum and cerium. These REE solutions could then be separated with commercial operations such as further solvent extraction or ion exchange, or an emerging technology could be used such as electrowinning or electrophoresis.

Example 3

A bio-based coal liquefaction process according to FIG. 5 was applied to coal. The process dissolves coal in a biosolvent, which prevents the ash from experiencing high temperature oxidizing environments. After digestion of the coal, the resulting oil is centrifuged to remove ash and heavy carbon deposits, and the residual material was then analyzed.

Figure 6:
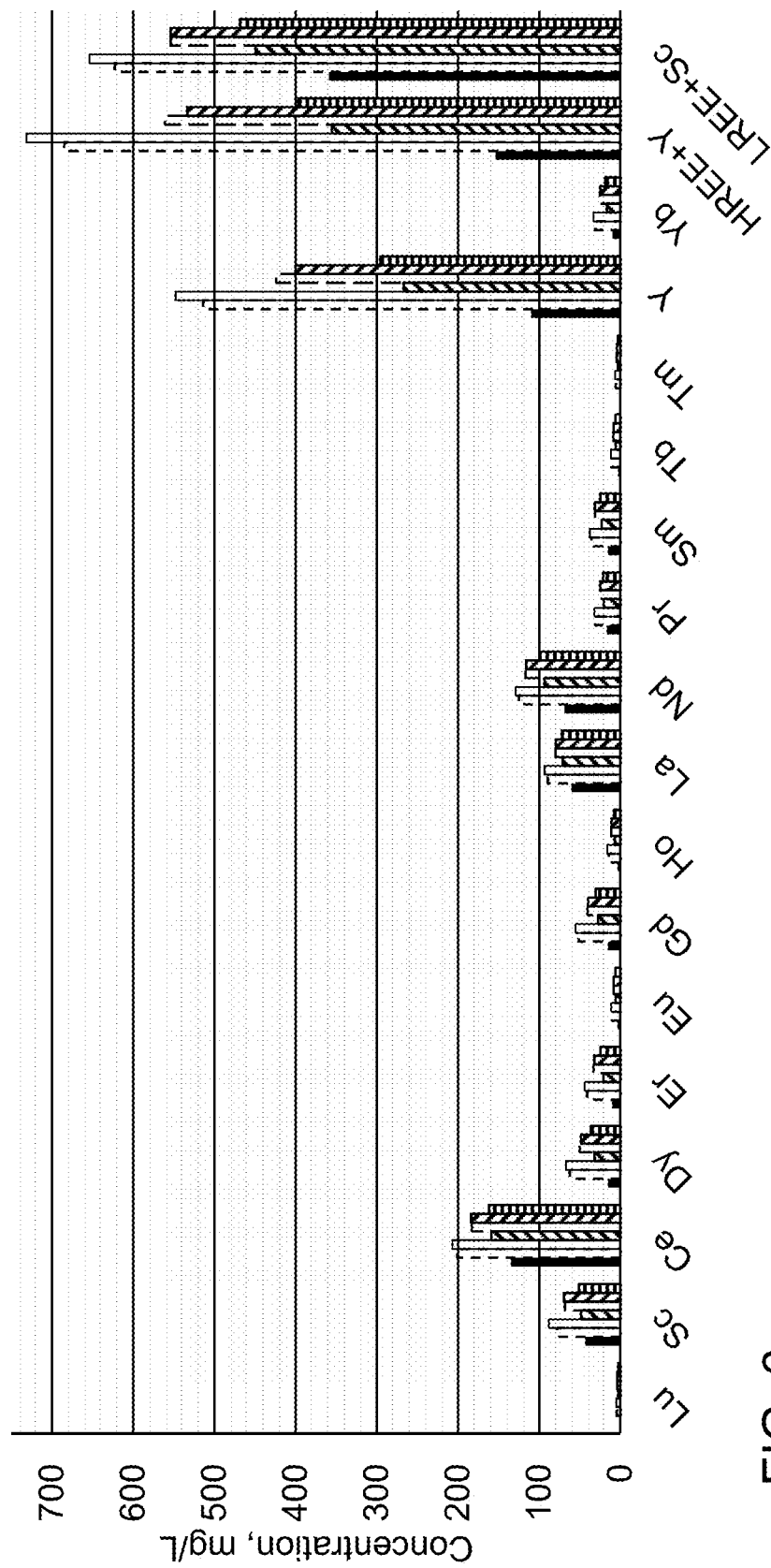
FIG. 6 is a graph showing the REE concentrations (mg/L) of various REEs in different fractions. The y-axis runs from 0 mg/L to 800 mg/L in increments of 100 mg/L. The elements are, running from left to right, Lu, Sc, Ce, Dy, Er, Eu, Gd, Ho, La, Nd, Pr, Sm, Tb, Tm, Y, Yb, HREE+Y, and LREE+Sc. With each element, from left to right, the fractions are the feed coal, the low density and high density cuts, and four particle size cuts (>850 microns, 600-850 microns, 355-600 microns, and <350 microns).
Figure 7:
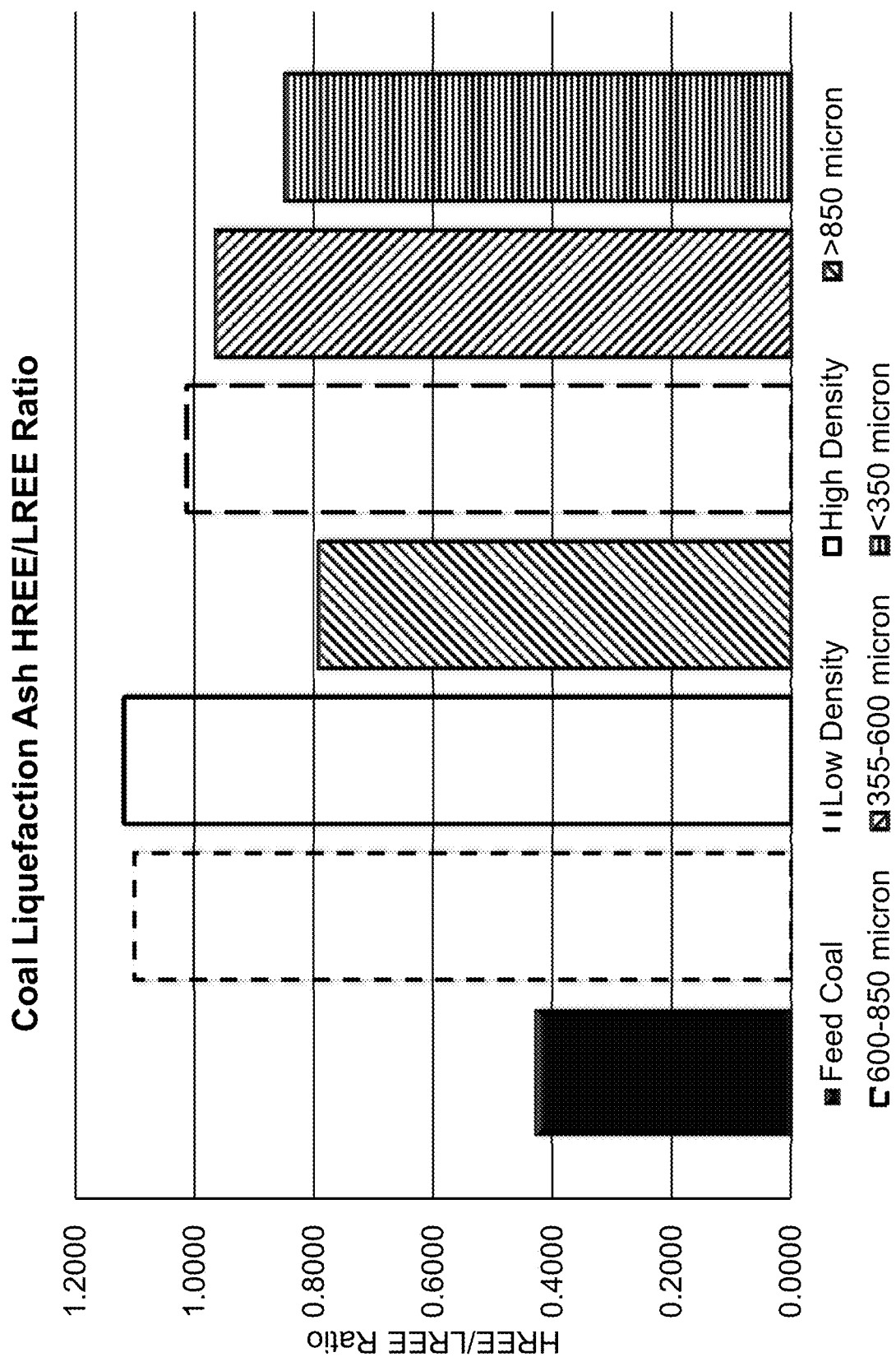
FIG. 7 is a bar graph showing the ratio of heavy REE to light REE in different fractions. The y-axis runs from 0.0000 to 1.2000 in increments of 0.2000. From left to right along the x-axis, the fractions are the feed coal, the low density and high density cuts, and four particle size cuts (>850 microns, 600-850 microns, 355-600 microns, and <350 microns).

The residual material was separated into two density cuts (high and low) by sink/float in deionized water. The residual material was also separated into four particle size cuts to determine whether a simple mechanical separation could cause meaningful concentration of the sample. FIG. 6 shows the concentration of REE through the processing of the coal liquefaction ash. FIG. 7 indicates the ratio of heavy REE to light REE in each cut, which also provides some information on changes in the ratio through the liquefaction process.

Referring to FIG. 6, it appears that the coal liquefaction process enriches REE over the feed coal. It is notable that the ash content of the coal liquefaction process samples used in this analysis was low; in the range of 7% ash, where it is normally expected to be 30% ash or higher. This could be due to preferential collection of larger particle size ashes. Alternatively, the REE enrichment could be caused by lesser dissolution of coal components that bear REE elements, causing differential enrichment.

The coal liquefaction process also appears to enrich the ash with the more valuable heavy rare earth components, as indicated in FIG. 7. Although the liquefaction process does seem to enrich REE, simple density and particle size separations of the residual material did not have a significant effect on REE enrichment.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A system for recovering rare earth elements, vanadium, cobalt, or lithium from coal ash, the system comprising:
   a leaching reactor for creating (i) a leachate containing the rare earth elements, vanadium, cobalt, or lithium, and (ii) leached ash;
   an ash dryer downstream of the leaching reactor for receiving the leached ash;
   a roaster downstream of the leaching reactor for receiving the leachate;
   a solid-liquid separation device downstream of the leaching reactor for separating the leached ash and the leachate from each other, wherein the ash dryer and the roaster are downstream of the solid-liquid separation device; and
   a heat recovery exchanger between the solid-liquid separation device and the roaster, the heat recovery exchanger receiving the leachate from the leaching reactor and acid vapor recovered from the roaster.

2. The system of claim 1, further comprising an evaporator downstream of the solid-liquid separation device and upstream of the roaster.

3. The system of claim 1, further comprising a reactor heater upstream of the leaching reactor, for preheating coal ash and acid fed to the leaching reactor.

4. A system for recovering rare earth elements, vanadium, cobalt, or lithium from coal ash, the system comprising:
   (A) a leaching reactor for creating (i) a leachate containing the rare earth elements, vanadium, cobalt, or lithium, and (ii) leached ash;
   (B) an ash dryer downstream of the leaching reactor for receiving the leached ash; and
   (C) a roaster downstream of the leaching reactor for receiving the leachate; and
   wherein either:
   (D) the system further comprises a condenser downstream of the roaster, the condenser receiving acid vapor from the roaster; or
   (E) the system further comprises a particle separation device downstream of the ash dryer, the particle separation device receiving acid vapor from the ash dryer; or
   (F) heated air used in the ash dryer is recovered and fed to the roaster.

5. The system of claim 4, further comprising an absorption column downstream of the condenser, the absorption column receiving (A) an acid solution from the condenser, and (B) acid vapor from the condenser or the ash dryer or the leaching reactor.

6. The system of claim 5, wherein the leaching reactor receives a recovered acid feed from the absorption column.

7. A system for recovering rare earth elements, vanadium, cobalt, or lithium from coal ash, the system comprising:
   a leaching reactor for creating (i) a leachate containing the rare earth elements, vanadium, cobalt, or lithium, and (ii) leached ash;
   an ash dryer downstream of the leaching reactor for receiving the leached ash;
   a roaster downstream of the leaching reactor for receiving the leachate;
   a caustic tank upstream of the leaching reactor for pretreating the coal ash before the coal ash enters the leaching reactor; and
   a caustic solid-liquid separator between the caustic tank and the leaching reactor, which creates a basic solution and an ash slurry, the ash slurry traveling to the leaching reactor.

8. The system of claim 7, further comprising a ball mill upstream of the leaching reactor or the caustic tank for reducing the particle size of the coal ash before the coal ash enters the leaching reactor.

9. The system of claim 7, wherein the caustic tank further includes a ball mill for reducing the particle size of the coal ash during pretreatment before the coal ash enters the leaching reactor.

* * * * *